United States Patent

O'Brien et al.

Patent Number: 5,858,066
Date of Patent: Jan. 12, 1999

[54] PROCESS FOR SEPARATING AND RECOVERING FLUOROCARBONS AND HCl FROM GASEOUS MIXTURES THEREOF

[75] Inventors: William G. O'Brien, Newark, Del.; Barry A. Mahler, Glen Mills, Pa.

[73] Assignee: E. I. du Pont de Nemours and Company, Wilmington, Del.

[21] Appl. No.: 861,140

[22] Filed: May 21, 1997

Related U.S. Application Data

[63] Continuation-in-part of Ser. No. 532,204, Sep. 22, 1995, abandoned.

[51] Int. Cl.$^6$ .................................................. B01D 53/22
[52] U.S. Cl. ......................................... 95/48; 95/45
[58] Field of Search .......................... 95/43, 45, 48

[56] References Cited

U.S. PATENT DOCUMENTS 4,941,893  7/1990  Hsieh et al. ............................. 55/16
5,196,616  3/1993  Lee et al. ............................. 95/48 X
5,456,841  10/1995  Lee .......................................... 95/45 X

FOREIGN PATENT DOCUMENTS 59-189926  10/1984  Japan ........................................ 95/48
61-187918  8/1986  Japan .

Primary Examiner—Robert Spitzer

[57] ABSTRACT

An improved process is disclosed for separating and recovering a fluorocarbon and hydrogen chloride (HCl) from a gaseous fluorocarbon/HCl mixture, wherein the fluorocarbon and HCl are difficult to separate by conventional means because of the presence or potential formation of an azeotrope or azeotrope-like composition in the mixture, such process comprising using a semi-permeable membrane unit to form a fluorocarbon-depleted stream and a fluorocarbon-enriched stream which may then be further processed individually by distillation.

12 Claims, 1 Drawing Sheet

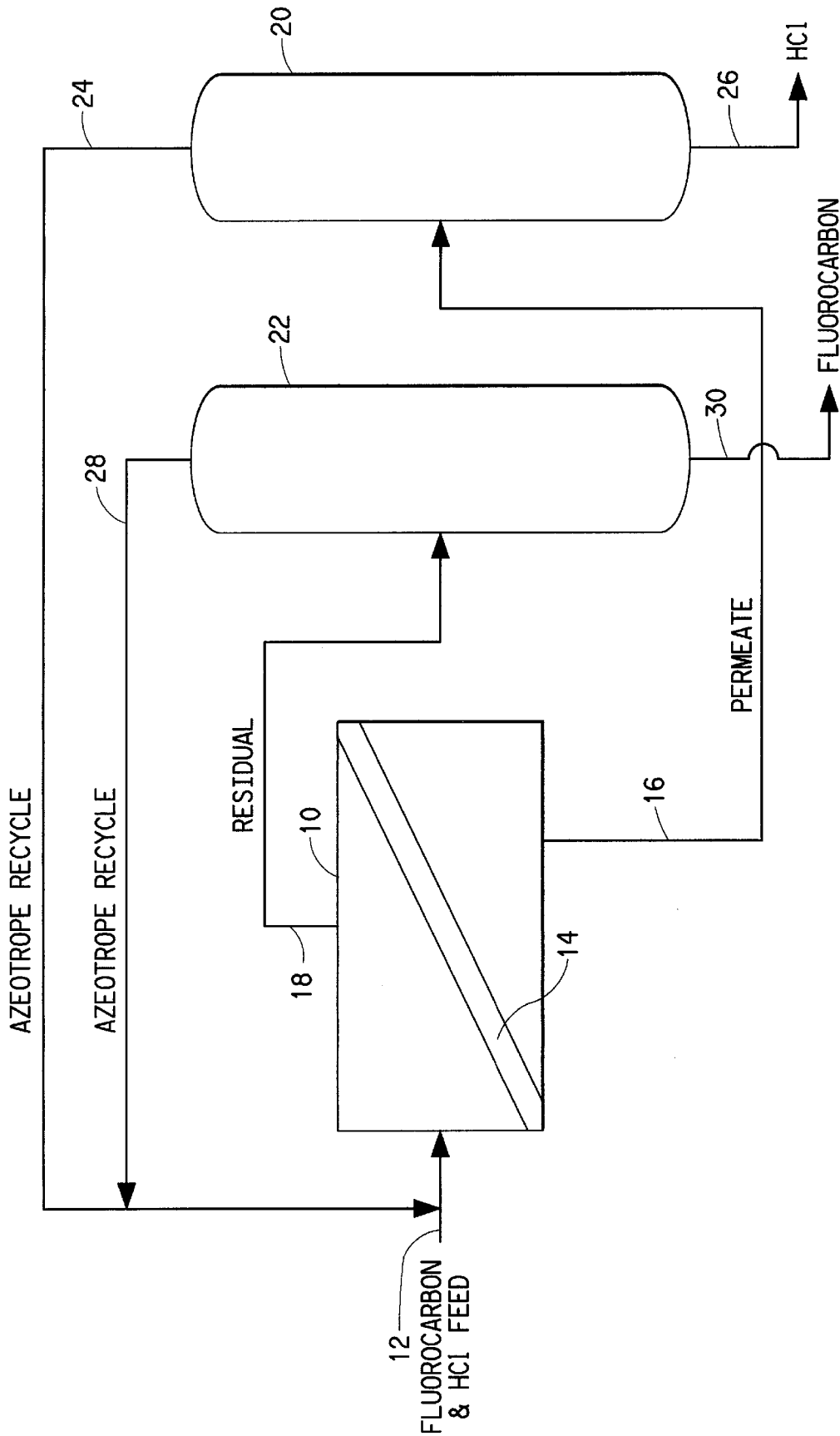
FIGURE

PROCESS FOR SEPARATING AND RECOVERING FLUOROCARBONS AND HCl FROM GASEOUS MIXTURES THEREOF

CROSS REFERENCE TO RELATED APPLICATION

This application is a continuation-in-part of application Ser. No. 08/532,204 filed on Sep. 22, 1995, now abandoned.

FIELD OF THE INVENTION

The present invention relates to an improved process for separating and recovering a fluorocarbon and hydrogen chloride (HCl) from a gaseous fluorocarbon/HCl mixture, wherein because of the presence or potential formation of an azeotrope or azeotrope-like composition, it is impractical to separate the mixture by conventional distillation. More basically, the present invention relates to separating a gaseous fluorocarbon/HCl mixture by use of a semi-permeable membrane unit into a fluorocarbon-depleted stream and a fluorocarbon-enriched stream which streams may then be further processed individually by repeated contact with the semi-permeable membrane or by distillation.

DESCRIPTION OF THE RELATED ART

It is well known that fluorocarbons (FC's) of commercial interest are typically manufactured by processes involving halogen exchange reactions. The term fluorocarbon is used herein as a general term to include any halocarbon containing fluorine, such as a chlorofluorocarbon (CFC), hydrogen-containing chlorofluorocarbon (HCFC), hydrogen-containing fluorocarbon (HFC), or a perfluorocarbon (PFC). Generally, an appropriate chlorocarbon or chlorofluorocarbon is reacted with a fluorine-containing compound which serves as a fluorine donor to replace at least one of the chlorine atoms. In many cases, the fluorine-donating source is hydrogen fluoride used in the presence of various catalytic compounds.

Such a process may be illustrated by the preparation of hexafluoroethane (C2F6), also known as Perfluorocarbon 116 (PFC-116) or Fluorocarbon 116 (FC-116). Typically, trichlorotrifluoroethane, dichlorotetrafluoroethane or chloropentafluoroethane is the chlorofluorocarbon precursor and hydrogen fluoride is the fluorine donor compound. This is illustrated in one or more of the following reactions:

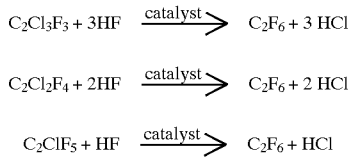

The catalysts which may be useful in these reactions include various metal halides or oxides and the reaction can be carried out either in liquid or vapor phase. When hydrogen fluoride is the fluorine donor compound used in the above processes, it is almost always used in excess of the stoichiometric amount required and may be as much as several times the stoichiometric amount. In the processes illustrated by the above equations, the crude reaction stream will contain byproduct HCl and unreacted HF in addition to the desired perfluorocarbon, and may as well contain unreacted, incompletely fluorinated and/or cleavage byproduct chlorofluorocarbons. While the bulk of these impurities can be separated by fractional distillation, others cannot be so separated because azeotropes or azeotrope-like mixtures may be present which are difficult to separate using conventional distillation.

A method to solve one particular such problem is disclosed in U.S. Pat. No. 5,718,807 the entire disclosure of which is hereby incorporated herein by reference. This application discloses a method to solve the separation problems associated with conventional hexafluoroethane manufacturing methods by providing an azeotropic distillation method for purifying the hexafluoroethane by distilling it in the presence of anhydrous HCl; usually, in the presence of an amount of HCl that is sufficient to form an azeotrope with all of the hexafluoroethane. In another aspect of the cited invention, certain other fluorocarbon impurities may also be separated from hexafluoroethane in a similar manner by virtue of their azeotrope or azeotrope-like compositions which are formed with anhydrous HCl.

In still another aspect of the cited invention, it provides a process for breaking the HCl/hexafluoroethane azeotrope into its individual components by liquefying and cooling the recovered azeotrope, and allowing the cooled composition to separate into HCl-rich and hexafluoroethane-rich layers within a decanter. The latter layer may then be decanted and purified by, for example, azeotropic distillation, thereby yielding substantially pure hexafluoroethane along with a separate stream of the hexafluoroethane/HCl azeotrope.

The HCl-rich layer may also be purified by azeotropic distillation to produce substantially pure anhydrous HCl and the HCl/hexafluoroethane azeotrope.

However, the above liquefaction/decantation process for breaking and separating the HCl/hexafluoroethane and/or other azeotrope or azeotrope-like compositions into their respective components has the disadvantage of being energy-intensive. It requires the cooling of the azeotrope or azeotrope-like compositions to temperatures below about −50 to −60 degrees C., followed by heating each decantation layer back to higher temperatures for economical distillation. These distillations only separate a portion of the decanted layer into a pure component, the remainder of the layer generating an additional large quantity of the starting azeotrope or azeotrope-like composition. This must then be recycled back to or prior to the liquefaction/decantation step.

The above liquefaction/decantation process is believed to be specific to the hexafluoroethane process and certain fluorocarbon impurities associated with that process. It is dependent on the mutual solubilities and relative densities of the fluorocarbon and HCl at very low temperatures, and is not necessarily applicable to other fluorocarbon manufacturing processes and their impurities.

While the above azeotrope or azeotrope-like compositions can also be broken and separated by extracting the HCl with water, this would require subsequently drying the purified hexafluoroethane or other fluorocarbons or chlorofluorocarbons to remove even traces of water. More importantly, water extraction would generate an aqueous HCl stream which has a much lower market value than anhydrous HCl.

There is a need for a process for separating azeotropes or azeotrope-like gaseous compositions of anhydrous HCl with fluorocarbons, and particularly for separating the azeotrope of HCl and hexafluoroethane, without the need for energy-intensive low temperature liquefaction/decantation steps or extraction/drying steps.

It has been recognized that anhydrous HCl can be separated from certain other gases by selective permeation through a semi-permeable membrane. For example, U.S. Pat. No. 4,941,893 (Union Carbide, 7/90) claims a method for separating gaseous silicon compounds from hydrogen or hydrogen halides by use of a semipermeable membrane. The preferred membrane is a polysulfone.

Japanese Patent 61187918 (Asahi Chemical, 8/86) discloses that gases such as hydrogen chloride, tetrafluoromethane, hexafluoroethane and others can be dehumidified by contacting them with a fluoro copolymer membrane that has a dry purge gas or depressurized zone on the opposite side of the membrane. This patent teaches that hydrogen chloride and hexafluoroethane are equivalent in their behavior under the permeation conditions exemplified.

Still other references teach methods of purifying aqueous acid solutions by use of semi-permeable membranes. None of the above references teach a process for efficient separation of azeotropes or azeotrope-like gaseous compositions of anhydrous hydrogen chloride and fluorocarbons.

SUMMARY OF THE INVENTION

The present invention provides an improved process for separating and recovering an organic stream containing fluorocarbons (e.g. chlorofluorocarbons, hydrochlorofluorocarbons, hydrofluorocarbons, perfluorocarbons and compounds containing only fluorine and carbon) and a hydrogen chloride stream from gaseous fluorocarbon/hydrogen chloride mixtures, particularly mixtures wherein because of the presence or potential formation of an azeotrope or azeotrope-like composition, it is impractical to separate the mixture by conventional distillation. The improved method according to the present invention involves the simultaneous use of a gas-phase membrane separation system with subsequent optional conventional distillation systems, thus producing a hybrid recovery unit. In particular, but not by way of limitation, this invention provides a process for the separation of a difficult-to-separate azeotrope or azeotrope-like gaseous mixture consisting essentially of a fluorocarbon composition and hydrogen chloride.

Thus, the present invention provides a process for separating and recovering a fluorocarbon phase and a hydrogen chloride phase from a gaseous feed stream of a mixture of fluorocarbons and anhydrous hydrogen chloride wherein the mixture is characterized as forming at least one azeotrope or azeotrope-like composition involving at least one fluorocarbon and hydrogen chloride, comprising the steps of: (a) providing a semi-permeable membrane means for gas-phase separation of fluorocarbons from hydrogen chloride wherein the semi-permeable membrane means is characterized as having a hydrogen chloride selectivity for the permeate relative to the non-permeate of at least 3; (b) passing the gaseous feed stream of fluorocarbons and hydrogen chloride across the feed side of the semi-permeable membrane such that hydrogen chloride passes preferentially through the membrane to form a fluorocarbon-depleted hydrogen chloride permeate stream and a fluorocarbon-enriched residual stream. Subsequently and optionally, the fluorocarbon-depleted stream from step (b) may be distilled, thus separating and recovering anhydrous hydrogen chloride; and, the fluorocarbon-enriched stream from step (b) may also be distilled, thus separating and recovering a fluorocarbon organic composition.

A process is disclosed for separating and recovering a fluorocarbon composition and a hydrogen chloride composition from a feed stream of a mixture of fluorocarbon and hydrogen chloride wherein said mixture is characterized as forming at least one azeotrope or azeotrope-like composition involving at least one fluorocarbon and hydrogen chloride, comprising the steps of (a) providing a semi-permeable membrane for separating fluorocarbon from hydrogen chloride having a feed side and a permeate side wherein said semi-permeable membrane is characterized as having a hydrogen chloride selectivity for the permeate relative to the non-permeate of greater than 1;

(b) passing a feed stream of fluorocarbon and hydrogen chloride across the feed side of the semi-permeable membrane such that the hydrogen chloride passes preferentially through the membrane to form a fluorocarbon-depleted hydrogen chloride permeate stream and a fluorocarbon-enriched residual stream.

According to one aspect of the present invention, if either the permeate stream or the residual stream exiting the semi-permeable membrane means is sufficiently pure that subsequent distillation is not necessary, only the other stream may be subjected to distillation. In one preferred embodiment according to the present invention, the fluorocarbon-depleted hydrogen chloride permeate stream is further characterized as having a hydrogen chloride concentration above that characteristic of the azeotrope or azeotrope-like composition involving hydrogen chloride and the fluorocarbon such that the azeotrope or azeotrope-like composition is also separated and recovered in the subsequent and optional distillation step. The fluorocarbon-enriched residual stream may be characterized as having a hydrogen chloride concentration below that of the azeotrope or azeotrope-like composition involving hydrogen chloride and the fluorocarbon such that the azeotrope or azeotrope-like composition is also separated and recovered in the subsequent and optional distillation step. The azeotrope or azeotrope-like compositions separated and recovered in the subsequent and optional distillation steps may be recycled to the inlet side of the semi-permeable membrane unit.

It is an object of the present invention to provide an effective and economical process for separating an azeotrope or azeotrope-like gaseous mixture of anhydrous hydrogen chloride and a fluorocarbon composition. It is a further object of the present invention to provide a process for separating and recovering the components of an azeotrope or azeotrope-like gaseous mixture of hydrogen chloride and a fluorocarbon composition which does not create any additional waste product disposal problems. It is a still further object of the present invention to provide a separation process for an azeotrope or azeotrope-like gaseous mixture of hydrogen chloride and a fluorocarbon composition which provides the components of said azeotrope or azeotrope-like mixture in essentially pure forms. Fulfillment of these objects and the presence and fulfillment of other objects will be apparent upon complete reading of the specification and claims taken in conjunction with the attached drawing.

BRIEF DESCRIPTION OF THE DRAWING

FIG. 1 represents a schematic illustration of a typical improved process for recovery of organic/hydrogen chloride compositions according to one embodiment of the present invention.

DETAILED DESCRIPTION OF THE INVENTION

The feed stream to be separated according to the improved process of the present invention can be any mixture of at least one fluorocarbon and hydrogen chloride that results in a fluorocarbon/HCl admixture that is difficult to separate by conventional distillation. Hence, for the purposes of the present invention, fluorocarbon refers broadly to any chlorofluorocarbon, hydrochlorofluorocarbon, hydrofluorocarbon, perfluorocarbon, compounds which contain only fluorine and carbon (i.e., CFC, HCFC, HFC, PFC and FC respectively) or mixtures thereof that form or tend to form a mixture with HCl that is difficult to separate by conventional distillation. As such, the term fluorocarbon is intended to include fluorocarbons that form or tend to form true azeotropes with HCl as well as fluorocarbons that form or tend to form azeotrope-like compositions with HCl. In other words, the feed stream according to the present invention does not have to be at the azeotrope or azeotrope-like concentration range but merely capable of forming a difficult-to-separate composition during distillation (as explained more fully later).

For purposes of the present invention, the term azeotrope refers to a constant boiling mixture of one or more fluorocarbons with HCl, which mixture behaves as a single substance, in that the vapor, produced by partial evaporation or distillation of the liquid has the same composition as the liquid, i.e. the mixture distills without substantial compositional change. Analogously, the term azeotrope-like, for purposes of this invention, refers generally to any such mixture of one or more fluorocarbons and HCl that exhibits a substantially constant composition on boiling (i.e. distills with little or no change in composition due to the closeness of the boiling points of the components in the mixture or due to some other reasons).

The fluorocarbons of particular use in the present invention include, by way of example but not limited thereto, aliphatic fluorocarbons of 1 to 3 carbon atoms containing at least one fluorine atom substituent. Thus, the term fluorocarbon will include chlorofluorocarbon, hydrochlorofluorocarbon, hydrofluorocarbon, perfluorocarbon or a fluorocarbon which contains only fluorine and carbon of from 1 to 3 carbon atoms and mixtures of all of these. More specifically, fluorocarbons of particular interest include hexafluoroethane, chloropentafluoroethane, dichlorotetrafluoroethane, trichlorotrifluoroethane, difluoroethane, trifluoroethane, pentafluoroethane, chlorotrifluoromethane, chlorodifluoromethane, difluoromethane, and trifluoromethane. In addition, the fluorocarbons in the present invention may also include unsaturated fluorocarbons such as tetrafluoroethylene and hexafluoropropylene.

In addition to the separation of individual fluorocarbons from their mixtures with HCl, the improved process of the present invention is particularly useful in separating and recovering various mixed fluorocarbons from their mixtures with HCl. Frequently commercial production of a fluorocarbon involves a sequential fluorination of a starting chlorocarbon, resulting in a distribution of reaction products and intermediates, all of which tend to make the mixture even more complex and difficult to separate and makes recovery of desired products more difficult by conventional distillation techniques. Thus various members of the fluoroethane series are frequently found together along with byproduct HCl and other impurities such as unreacted HF and certain halomethanes resulting from haloethane cleavage reactions.

As disclosed in previously cited U.S. Pat. No. 5,718,807, certain of these compounds form azeotropes with HCl, making such mixtures unsuitable for separation from HCl by distillation. These mixtures can occur either because of byproduct HCl or because of HCl added to remove certain organic impurities as disclosed in the referenced patent application. Manufacturing processes for still other fluorocarbons can result in mixtures which contain some of these disclosed fluorocarbon/HCl azeotropes or azeotrope-like combinations, or can contain other fluorocarbon/HCl azeotrope or azeotrope-like combinations. These mixtures are particularly amenable to the benefits of the present invention.

The present invention provides a separation process for difficult-to-separate fluorocarbon mixtures which avoids energy-intensive liquefaction steps, does not require the addition of any extraneous components to the mixture to be separated, does not alter any of the components of the fluorocarbon composition and minimizes or eliminates any additional waste disposal problems. In essence, in the present invention, the difficult-to-separate fluorocarbon/HCl composition is initially treated with a selected semipermeable polymer membrane which provides two compositions, each of which is enriched in one or the other of the components in the original composition (i.e. either the organic component or the HCl component). Subsequent and optional treatment, such as distillation of the two compositions, can then provide the components of the original composition in more purified forms.

The present invention may perhaps be best explained and understood by reference to the drawing and by illustrating the separation of an azeotrope or azeotrope-like mixture of hexafluoroethane and hydrogen chloride (HCl) relative to the FIGURE as one embodiment. As previously mentioned, hexafluoroethane is typically manufactured by the process of fluorinating trichlorotrifluoroethane, dichlorotetrafluoroethane or chloropentafluoroethane using hydrogen fluoride as the fluorine source. Hydrogen chloride is then a byproduct of the reaction. If the azeotropic distillation process previously cited in U.S. Pat. No. 5,718,807 is employed, additional HCl may be added as part of the part of the purification process to remove unwanted fluorocarbon impurities.

In any case, at some point in the purification sequence for hexafluoroethane, a mixture of hydrogen chloride and hexafluoroethane may result which cannot be separated by conventional distillation because hydrogen chloride and hexafluoroethane form an azeotrope or azeotrope-like mixture containing about 36 to 40 mole percent hexafluoroethane and 64 to about 60 mole percent hydrogen chloride. Such a mixture, under current practices, is usually treated by scrubbing the HCl from the mixture, resulting in an aqueous stream of HCl to be sold or disposed of. This usually results in the loss of most of the sales value of the hydrogen chloride because of a limited market for aqueous HCl. In many cases the aqueous HCl must be neutralized and otherwise disposed of, resulting in still greater cost as well as an undesirable effect on the environment.

If the optional liquefaction process disclosed in U.S. Pat. No. 5,718,807 is employed, this specific azeotrope or azeotrope-like composition can be broken by liquefaction and decanting. However, this liquefaction process is energy-intensive because of the low temperatures (−50 to −60 degrees C.) required for liquefaction, the need to reheat to much higher temperatures for subsequent distillation steps, and the large amount of azeotrope produced in the distillation steps which must be recycled. Furthermore, it is a specific process applicable to certain hexafluoroethane/HCl compositions and which is not necessarily applicable to other fluorocarbon/HCl azeotrope or azeotrope-like compositions. In contrast and as conceptionally illustrated in the FIGURE, in the present process the above hexafluoroethane/HCl composition is typically introduced into a membrane separation unit 10 via inlet 12 as the fluorocarbon/HCl feed stream. Within the separation unit 10, the feed stream makes contact with selected semi-permeable polymer membrane 14. Because of the preferential permeability of HCl across the membrane 14, the separation unit 10 produces a permeate stream exiting via line 16 wherein the concentration of HCl is enriched typically about 3 fold or more relative to its concentration in the nonpermeate residual stream. Simultaneously, a non-permeate residual stream is continuously withdrawn via line 18 wherein the HCl concentration is proportionately depleted relative to the permeate composition. Thus, in the hexafluoroethane/HCl azeotrope illustration, a typical feed stream to the membrane unit 10 would be at about 25 degrees C. and about 200 psig (1480 KPa, absolute) and would contain about 62 mole percent HCl. The residual stream exiting outlet 18 would have an HCl concentration reduced to about 11 mole percent, representing substantial one-pass recovery.

By taking advantage of the fact that the fluorocarbon (hexafluoroethane, the illustrated embodiment) and HCl form an azeotrope, more purified fluorocarbon and more purified HCl may be recovered by subsequent distillation steps. Thus, the permeate composition exiting the membrane unit 10 via line 16 may be distilled in column 20. The small amount of fluorocarbon/HCl azeotrope being distilled overhead may be then recycled via line 24 to the feed side of the permeation unit 10 and essentially purified HCl may be recovered as distillation bottoms via line 26. If the azeotropic distillation process of U.S. Pat. No. 5,718,807 is employed for the purification of hexafluoroethane, the HCl can be recycled in lieu of fresh HCl to the azeotropic distillation system. Similarly, the non-permeate residual composition exiting the membrane unit via line 18 may be distilled in column 22. The small amount of fluorocarbon/HCl azeotrope being distilled overhead may be recycled via line 28 to the feed side of the permeation unit 10 and purified fluorocarbon may be recovered via line 30 from the distillation bottoms. Of course, both the HCl and fluorocarbon may be subjected to further purification, if desired. Also, if either the permeate or non-permeate streams can be utilized without subsequent distillation, then one of the columns may be eliminated and a single column in combination with the membrane unit may be employed and should be considered an equivalent process for the purpose of this invention.

The semi-permeable polymer membrane useful in the present invention for the permeation step of the process may be any hydrogen chloride-resistant polymeric material which can be formed into any shape which exhibits the desired selective permeability as defined later. The semi-permeable polymer membrane, seals and physical housing of the separation unit should be chemically resistant to long term HCl exposure especially when water is present at trace levels. In addition, the polymer should typically have a number of polar groups as part of the repeating chain to facilitate initial sorption of the highly polar HCl over the less polar fluorocarbon. The polymer should typically be fairly dense, glassy (Tg greater than 50 degrees C.) to allow a reasonable diffusional transport rate of the small HCl species yet impede the relatively large bulky fluorocarbon. Polyimide membranes already in commercial use for conventional (e.g. oxygen/nitrogen separations) gas separation processes, such as 1,3-isobenzofurandione, 5,5'-carbonylbis-, polymer with 1 (or 3)-(4-aminophenyl)-2,3-dihydro-1,3,3(or1,1,3)-trimethyl-1H-inden-5-amine (manufactured by Ciba-Geigy as Matrimid® 5218), are preferred because of convenience and low cost.

The semi-permeable membrane unit (the permeator) useful in the present invention can be generally any such device as is well known in the art, including by way of example, but not limited thereto, a semi-permeable membrane thin layer of film (i.e. the so-called plate and frame unit), a spiral wound membrane, a hollow fiber semi-permeable membrane and the like (including combinations of such devices). For the semi-permeable membrane to separate the fluorocarbon/HCl mixture into a fluorocarbon-depleted permeate stream and a fluorocarbon-enriched residual stream, there must be a difference or selectivity in the permeation rates for the fluorocarbon and the HCl compositions. For purposes of this invention, the necessary preferential permeation rate for the HCl through the membrane relative to the permeation rate of the fluorocarbon phase can be satisfied and/or confirmed by considering the ratio of the HCl concentration in the permeate relative to the concentration of HCl in the non-permeate. This ratio, hereinafter referred to as HCl selectivity, can vary from as little as greater than 1 to more typically 5 or higher and is frequently higher than 8. Preferably this selectivity should be 5 or greater.

As in any permeation separation process, the parameters usually considered as variables to enhance the separation process are the temperature, the pressure differential between the feed side of the permeation membrane and the permeate side of the membrane, the residence time of the feed stream on the feed side of the membrane, and the residence time of the permeate stream on the permeate side of the membrane. To achieve reasonable productivity at a desireable quality, the polymer membrane which does the actual separation may be quite thin, i.e., less than 1 micron. Due to some process requirements and dew point limitations for some fluorocarbons, the separation unit may be operated over a range of temperatures, e.g., 0 to 75 degrees C. For low cost and to minimize equipment size the inexpensive hollow fiber configuration is preferred over the usually more expensive spiral wound module. Typically hollow fibers provide 10 to 30 times the membrane surface area relative to spiral wound elements for a given process volume. To facilitate desorption into the permeate gas phase, the permeate side of the membrane should operate at lower pressure relative to the upstream feed side. The membrane structure must be integrally strong to withstand the net force associated with this pressure differential. For example, a 1 square foot membrane operation with an average upstream pressure of 100 psig and downstream permeate pressure of 10 psig must withstand a deformation force of over 6 tons. In the instant invention, these parameters are not critical so long as the membrane material is not destructively affected and the HCl selectivity is not lost.

Temperature is not critical and may be any convenient temperature, usually from about 0 to 150 degrees C. The primary temperature limitations are the temperature should be below any temperature at which the membrane is affected adversely and above the dew point of the fluorocarbon. Conveniently, the temperature range will be between about 0 and about 75 degrees C.

The pressure differential between the feed side of the membrane and the permeate side is not critical but is preferentially at least about one-tenth (0.1) atmosphere. The process may be operated at a lower pressure differential but the separation process will be slower. The pressure differential can be the result of higher pressure on the feed side of the semi-permeable membrane or the result of reduced pressure on the permeate side of the membrane or both.

The following examples are presented to further illustrate specific embodiments of the invention. All references to percentages of composition are mole percent unless otherwise indicated.

EXAMPLE 1

A 690 gram mixture of 477 grams of PFC-116 and 213 grams of anhydrous HCl was placed in a 2-liter pressure cylinder at 750 psig (5276 KPa, absolute) cylinder pressure. This corresponds to about 37.2 mole % PFC-116 and 62.8 mole % HCl, the azeotrope composition. The cylinder was connected to a flow measuring device and then to the inlet side of a permeation separator with a commercial polyimide membrane in the form of a hollow fiber. The membrane used was Ciba-Geigy's Matrimid® 5218 polyimide skin covering a bulk porous fiber wall made of General Electric's Ultem® 1000 (a high molecular weight polymer). The permeate gas was fed to a flowmeter, then to a scrubbing tank containing 2.5% NaOH, and then to a flowmeter at 0 psig (101 KPa, absolute). The non-permeate gas was fed to a flowmeter and then to a cylinder immersed in liquid nitrogen at −195 degrees C. and 0 psig (101 KPa, absolute).

The cylinder pressure was reduced and regulated to a steady 120 psig (929 KPa, absolute) as feed inlet pressure and the temperature was regulated to 25degrees C. A needle valve was used to control the exit pressure for the non-permeate gas at 105 psig (826 KPa, absolute). A nominal 6 psig (142 KPa, absolute) permeate back pressure was created by glass frit used to sparge the permeate gas into the base of the scrubbing tank. The feed cylinder weight loss was continuously measured during the course of the experiment. The experiment was stopped shortly after the cylinder pressure dropped below the desired 120 psig (929 KPa, absolute), a period of about 70minutes. It was noted that the pressure in the liquid nitrogen receiver rose during the course of the experiment, presumably caused by a temperature rise due to the insulating effect of the progressive build-up of frozen PFC-116 on the receiver walls.

The scrubbing tank was completely effective in removing HCl, as shown by repeated tests with wet litmus paper. The PFC-116 removed by the scrubbing tank was negligible due to its extremely low solubility in dilute room temperature caustic solution. While the flow into the scrubbing tank began almost immediately at about 2.5 liters/minute, it took over 13 minutes for a measurable flow of gas (about 0.02 liters/minute) to appear in the outlet from the scrubbing tank. This indicates that HCl permeated through the membrane quickly, while there was a substantial lag in the permeation of PFC-116, believed to be initial evidence of a large difference in diffusivity rates between the HCl and the PFC-116. As the permeation proceeded, the percent of PFC-116 in the permeate gradually increased, indicating that the HCl may slightly plasticize the polymer skin layer, causing it to swell and increase the diffusivity of the PFC-116 relative to the HCl. In this trial, steady state conditions were apparently reached just as the feed materials in the pressure cylinder were being exhausted. Overall material balances were based on the weight loss in the pressure cylinder, weight gain in the liquid nitrogen receiver, caustic consumption in the scrubbing liquid, and caustic scrubbing of the non-permeate. These indicated that the recovery of HCl was 99.8% complete, and the recovery of PFC-116 was 99.6% complete.

Overall separation results are shown in Table 1 below, with results expressed in mole %:

TABLE 1

Separation of PFC-116/HCl at 120 psig (929 KPa, absolute)

| Component | Feed | Permeate | Non-permeate |
|---|---|---|---|
| PFC-116 | 37.2 | 9.4 | 93.8 |
| HCl | 62.8 | 90.6 | 6.2 |

In the above trial, the overall HCl selectivity (defined as the ratio of HCl in the permeate to that in the non-permeate) was 14.6. However, the inadequate time at steady state conditions indicated a need for additional trials to establish steady state operation results.

EXAMPLE 2

A 695 gram mixture of 477 grams of PFC-116 and 218 grams of anhydrous HCl was placed in a 2-liter pressure cylinder at 750 psig (5276 KPa, absolute) cylinder pressure. This corresponds to about 36.7 mole % PFC-116 and 63.3mole % HCl, near the azeotrope composition. The same apparatus and membrane was used as in Example 1.

The cylinder pressure was reduced and regulated to a steady 90 psig (122 KPa, absolute) feed inlet pressure with the temperature regulated to 25 degrees C. A needle valve was used to control the exit pressure for the non-permeate gas at 75psig (619 KPa, absolute). A nominal 6 psig (143 KPa, absolute) permeate back pressure was created by the glass frit used to sparge the permeate gas into the base of the scrubbing tank. Measurements of flows and compositions were made as in Example 1.

Under these conditions, a steady state operation was achieved in about 50 to 60 minutes and continued for a total operating time of about 110 minutes. Recovery of HCl was 99.4% complete, and the recovery of PFC-116 was 96.3% complete.

Overall separation results are shown in Table 2 below, with results expressed in mole %;

TABLE 2

Separation of PFC-116/HCl at 90 psig

| Component | Feed | Permeate | Non-permeate |
|---|---|---|---|
| PFC-116 | 36.6 | 14.7 | 91.3 |
| HCl | 63.4 | 85.3 | 8.7 |

Overall HCl selectivity was about 9.8. While this ratio was lower than that in Example 1, it is a much better example of steady state performance.

EXAMPLE 3

A 678 gram mixture of 476 grams of PFC-116 and 202 grams of anhydrous HCl was placed in a 2-liter pressure cylinder at 750 psig (5276 KPa, absolute) cylinder pressure. This corresponds to about 38.4 mole % PFC-116 and 61.6 mole % HCl, near the azeotrope composition. The same apparatus and membrane was used as in Example 1.

The cylinder pressure was reduced and regulated to a steady 60 psig (515 KPa, absolute) feed inlet pressure with the temperature regulated to 25 degrees C. A needle valve was used to control the exit pressure for the non-permeate gas at 45psig (412 KPa, absolute). A nominal 6 psig (143 KPa, absolute) permeate back pressure was created by the glass frit used to sparge the permeate gas into the base of the scrubbing tank. Measurements of flows and compositions were made as in Example 1.

Under these conditions, a steady state operation was achieved in about 10 minutes and continued for a total operating time of about 160 minutes. Recovery of HCl was 98.9% complete, and the recovery of PFC-116 was 95.3% complete.

Overall separation results are shown in Table 3 below, with results expressed in mole %:

TABLE 3

Separation of PFC-116/HCl at 60 psig

| Component | Feed | Permeate | Non-permeate |
|---|---|---|---|
| PFC-116 | 38.4 | 13.4 | 88.9 |
| HCl | 61.6 | 86.6 | 11.1 |

Overall HCl selectivity was about 7.8. Again, this ratio was lower than that in Example 1 but a better example of steady state performance.

The above results show that an azeotrope of PFC-116 and anhydrous HCl can be separated by a polyimide membrane into an HCl-rich permeate and a PFC-116-rich non-permeate at room temperature. The resulting compositions are very different than the azeotrope composition, making subsequent separations into pure PFC116 and HCl by distillation easy to carry out by one skilled in the art, and yielding only a relatively small fraction of azeotrope which requires recycle.

For this same separation, the previously described liquefaction/decantation process had a much lower HCl selectivity. If we define its HCl selectivity for comparison purposes as the ratio of the HCl content of the upper and lower decanted layers, this selectivity was only 1.8 at −50 degrees C. Even when the liquefaction/decantation temperature was reduced to −60 degrees C., the HCl selectivity was improved only to 3.2.

As a result the decanted layers are much closer in composition to the starting azeotrope composition than the present inventive membrane process. This means that the liquefaction/decantation process will require a much higher recycle of azeotropic material after any subsequent distillation step than the present inventive process. This higher recycle rate will require larger, more expensive distillation columns, utilizing still more energy for boilup and reflux in addition to the high energy requirements of the low temperature liquefaction step.

EXAMPLE 4

Using the same apparatus and hollow fiber system described in EXAMPLE 1, an azeotrope mixture of anhydrous HCl (74.3 m %) and tetrafluoroethylene (TFE) was fed to the hollow fibers at a rate of 4.8 g/minute at a nominal pressure of 60 psig with an axial pressure of 50 psig and a permeate pressure of ~0 psig. The temperature of the hollow fibers was allowed to run to 22 degrees C. A steady state was reached in 40 to 45 minutes. Based on a volumetric feed rate of approximately 0.4 lt/min (60 psig) and total fiber volume of 1.4 cm$^3$, the average residence was ~0.2 second. The permeate vapor was 85.1 m % HCl, and the non-permeate vapor was 34.0 m % HCl.

The above results for the inventive membrane separation process can be readily optimized by one skilled in the art by utilizing other membranes, separation pressures, temperatures and hold times. By simple experimentation not amounting to invention this inventive process may also be extended to other fluorocarbon/HCl

I claim:

1. A process for separating and recovering a fluorocarbon composition and a hydrogen chloride composition from a feed stream of a mixture of fluorocarbon and hydrogen chloride wherein said mixture is characterized as forming at least one azeotrope or azeotrope-like composition involving at least one fluorocarbon and hydrogen chloride, comprising the steps of (a) providing a semi-permeable membrane for separating said fluorocarbon from said hydrogen chloride having a feed side and a permeate side wherein said semi-permeable membrane is characterized as having a hydrogen chloride selectivity for the permeate relative to the non-permeate of greater than 1;

(b) passing a feed stream of said mixture of fluorocarbon and hydrogen chloride across the feed side of the semi-permeable membrane such that the hydrogen chloride passes preferentially through the membrane to form a fluorocarbon-depleted hydrogen chloride permeate stream and a fluorocarbon-enriched residual stream.

2. The process of claim 1 wherein said fluorocarbon-depleted hydrogen chloride stream is subsequently distilled or further purified with a semi-permeable membrane to form a more purified hydrogen chloride composition.

3. The process of claims 1 or 2 wherein said fluorocarbon enriched residual stream is distilled or further purified with a semi-permeable membrane to form a more purified fluorocarbon composition.

4. The process of claims 3 wherein said fluorocarbon-depleted HCl stream is further characterized as having a hydrogen chloride concentration above that of said azeotrope or azeotrope-like composition contained in said feed stream.

5. The process of claim 3 wherein said fluorocarbon-enriched residual stream is further characterized as having a fluorocarbon concentration above that of said azeotrope or azeotrope-like composition contained in said feed stream.

6. The process of claim 3 wherein said semi-permeable membrane is a polyimide polymer.

7. The process of claim 3 wherein said step (b) is operated at a temperature of 0 to 150 degrees C.

8. The process of claim 3 wherein step said (b) is operated with a pressure differential between said feed side of the membrane and the permeate side of the membrane of greater than 0.1 atmospheres.

9. A process for separating and recovering a fluorocarbon composition and a hydrogen chloride composition from a feed stream of a mixture of fluorocarbon and hydrogen chloride wherein said mixture is characterized as forming at least one azeotrope or azeotrope-like composition involving at least one fluorocarbon and hydrogen chloride, comprising the steps of (a) providing a semi-permeable membrane for separating said fluorocarbon from said hydrogen chloride having a feed side and a permeate side wherein said semi-permeable membrane is characterized as having a hydrogen chloride selectivity for the permeate relative to the non-permeate of greater than 1;

passing a feed stream of said mixture of fluorocarbon and hydrogen chloride across the feed side of the semi-permeable membrane such that the hydrogen chloride passes preferentially through the membrane to form a fluorocarbon-depleted hydrogen chloride permeate stream and a fluorocarbon-enriched residual stream; wherein (i) said fluorocarbon-depleted hydrogen chloride stream has a hydrogen chloride concentration above that of said azeotrope or azeotrope-like composition contained in said feed stream; (ii) said fluorocarbon-enriched residual stream has a fluorocarbon concentration above that of said azeotrope or azeotrope-like composition contained in said feed stream, and (iii) said fluorocarbon is selected from the group consisting of C1 to C3 chlorofluorocarbons, hydrochlorofluorocarbons, hydrofluorocarbons, and compounds containing only carbon and fluorine.

10. The process of claim 9 wherein said fluorocarbon is hexafluoroethane.

11. The process of claim 9 wherein said fluorocarbon is tetrafluoroethylene.

12. The process of claim 9 wherein said semipermeable membrane is a polyimide polymer.

* * * * *